(12) United States Patent
Lam (10) Patent No.: US 9,223,351 B2
(45) Date of Patent: Dec. 29, 2015

(54) MOVEABLE DISPLAY PORTION OF A COMPUTING DEVICE

(71) Applicant: Google Inc., Mountain View, CA (US)

(72) Inventor: Lawrence Lam, San Jose, CA (US)

(73) Assignee: Google Inc., Mountain View, CA (US)

( * ) Notice: Subject to any disclaimer, the term of this patent is extended or adjusted under 35 U.S.C. 154(b) by 148 days.

(21) Appl. No.: 13/796,563

(22) Filed: Mar. 12, 2013

(65) Prior Publication Data

US 2015/0198979 A1 Jul. 16, 2015

(51) Int. Cl.
G06F 1/16 (2006.01)

(52) U.S. Cl.
CPC .................... *G06F 1/1654* (2013.01)

(58) Field of Classification Search
CPC ......................................... G06F 1/16
USPC ........... 361/679.09, 679.01–679.45, 361/679.55–679.61, 724–747, 752–759, 361/796–802, 805–837; 312/223.2, 7.1, 312/319.9, 333, 348.3, 222, 226; 455/575.1–575.5, 347, 550.1, 90.3; 248/309.1, 316.8, 917, 922, 923, 346.4
See application file for complete search history.

(56) References Cited

U.S. PATENT DOCUMENTS

| | | | |
|---|---|---|---|
| 5,335,142 A * | 8/1994 | Anderson | 361/679.07 |
| 5,796,576 A * | 8/1998 | Kim | 361/679.28 |
| 6,788,527 B2 * | 9/2004 | Doczy et al. | 361/679.11 |
| 6,867,961 B2 * | 3/2005 | Choi | 361/679.06 |
| 6,952,340 B2 * | 10/2005 | Son et al. | 361/679.09 |
| 7,129,931 B2 * | 10/2006 | Pappas | 345/168 |
| 7,130,186 B2 * | 10/2006 | Yu | 361/679.27 |
| 7,298,610 B2 * | 11/2007 | Kim et al. | 361/679.55 |
| 7,345,871 B2 * | 3/2008 | Lev et al. | 361/679.27 |
| 7,375,956 B2 * | 5/2008 | Chuang et al. | 361/679.55 |
| 7,551,431 B2 * | 6/2009 | Nakajima | 361/679.06 |
| 7,652,873 B2 * | 1/2010 | Lee | 361/679.06 |
| 7,656,661 B2 * | 2/2010 | Shaum | 361/679.55 |
| 7,706,137 B2 * | 4/2010 | Iijima et al. | 361/679.07 |
| 7,800,893 B2 * | 9/2010 | Tracy et al. | 361/679.27 |
| 8,437,126 B2 * | 5/2013 | Holung et al. | 361/679.29 |
| 8,537,529 B2 * | 9/2013 | Qiu et al. | 361/679.02 |
| 8,861,187 B2 * | 10/2014 | Takahashi | 361/679.06 |
| 2002/0109962 A1 * | 8/2002 | Tseng et al. | 361/681 |
| 2004/0090742 A1 * | 5/2004 | Son et al. | 361/686 |
| 2008/0238816 A1 * | 10/2008 | Matsushita | 345/30 |
| 2012/0293938 A1 * | 11/2012 | Dai et al. | 361/679.07 |

* cited by examiner

*Primary Examiner* — Courtney Smith
*Assistant Examiner* — Rashen E Morrison
(74) *Attorney, Agent, or Firm* — Brake Hughes Bellermann LLP (57) ABSTRACT

The computing device includes a base portion including a keyboard, a display portion including a display. The display includes a viewable surface and a hinge configured to operably couple the base portion to the display portion. If the computing device is in a closed position the viewable surface faces in a first direction away from the base portion. Further, if the computing device is in a transition from the closed position to an open position, the hinge is further configured to rotate around a first axis of the base portion with a primary plane of the display portion being substantially parallel to a primary plane of the base portion and to rotate around a second axis of the display portion such that the viewable surface faces in a second direction toward a user plane extending from the keyboard and approaches a perpendicular position with respect to the base portion.

18 Claims, 5 Drawing Sheets

MOVEABLE DISPLAY PORTION OF A COMPUTING DEVICE

BACKGROUND

1. Field

Embodiments relate to a moveable display portion of a computing device.

2. Related Art

Many known computing devices can have several mechanisms through which a user may interact with (e.g., trigger) one or more functions of the computing device. For example, user input devices such as keyboards, mouse devices, touch screen displays and/or so forth, through which a user may interact with computing devices to perform one or more computing functions, can be connected with and/or integrated into the computing devices.

SUMMARY

One embodiment includes a computing device. The computing device includes a base portion including a keyboard, a display portion including a display. The display includes a viewable surface and a hinge configured to operably couple the base portion to the display portion. According to example embodiments, if the computing device is in a closed position the viewable surface faces in a first direction away from the base portion. Further, if the computing device is in a transition from the closed position to an open position, the hinge is further configured to rotate around a first axis of the base portion with a primary plane of the display portion being substantially parallel to a primary plane of the base portion and to rotate around a second axis of the display portion such that the viewable surface faces in a second direction toward a user plane extending from the keyboard and approaches a perpendicular position with respect to the base portion.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Example embodiments describe a computing device. The computing device includes a base portion including a keyboard, a display portion including a display, the display including a viewable surface and a hinge configured to operably couple the base portion to the display portion. According to example embodiments, if the computing device is in a closed position the viewable surface faces in a first direction away from the base portion. Further, if the computing device is in a transition from the closed position to an open position, the hinge is further configured to rotate around a first axis of the base portion with a primary plane of the display portion being substantially parallel to a primary plane of the base portion and to rotate around a second axis of the display portion such that the viewable surface faces in a second direction toward a user plane extending from the keyboard and approaches a perpendicular position with respect to the base portion.

Figure 1:
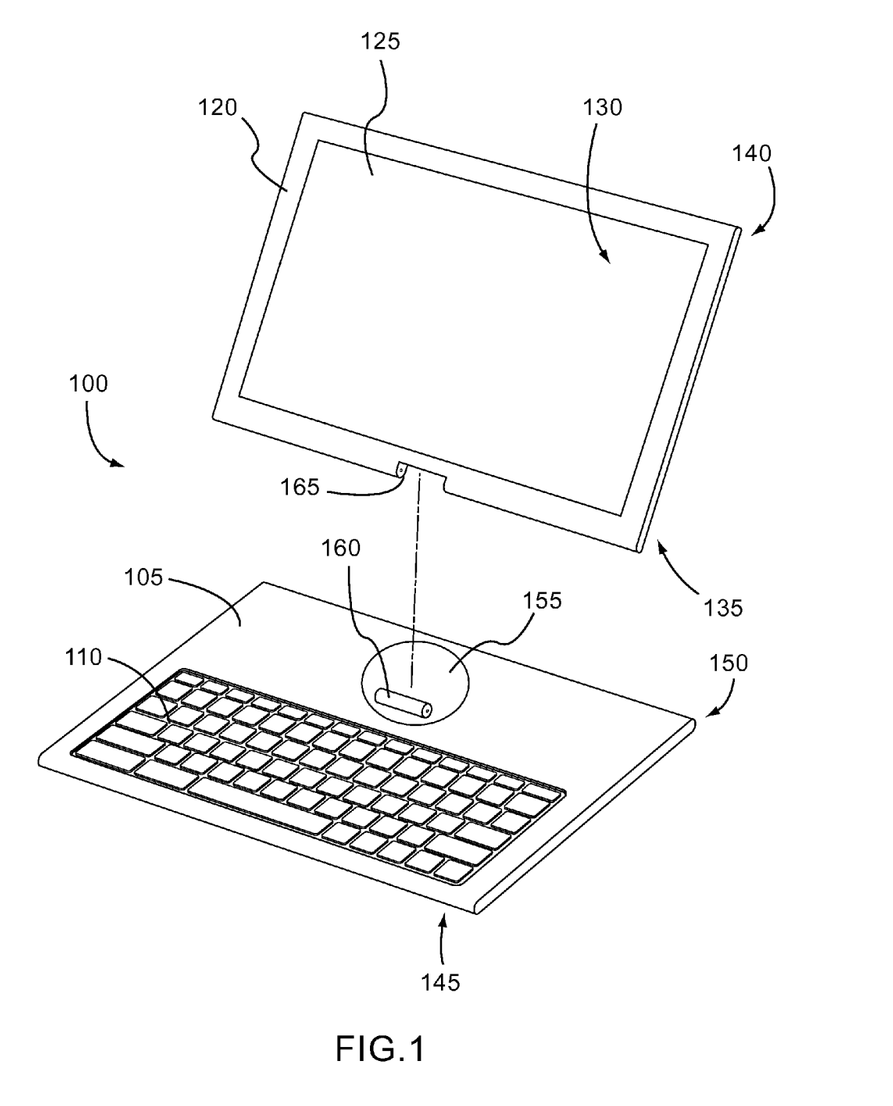
FIG. 1 illustrates a view of a computing device including a base portion and a display portion operably coupled to the base portion according to an example embodiment.

FIG. 1 illustrates a view of a computing device including a base portion and a display portion operably coupled to the base portion according to an example embodiment. As shown in FIG. 1, the computing device 100 includes a display portion 120 and a base portion 105. The display portion 120 includes a display 125, and the base portion 105 includes an input device region 110 (e.g., a keyboard). The display 125 may have a display surface 130 (also may be referred to as a viewable surface) upon which illuminated objects may be displayed and viewed by a user.

According to one or more example embodiments, the display 125 is a touch sensitive display that may be any type of touch sensitive display. For example, the display 125 may be, or may include, for example, an electrostatic touch device, a resistive touchscreen device, a surface acoustic wave (SAW) device, a capacitive touchscreen device, a pressure sensitive device, a surface capacitive device, a projected capacitive touch (PCT) device, and/or so forth. As a touch sensitive device, the display 125 may function as an input device. For example, the display 125 may be configured to display a virtual keyboard (e.g., emulate a keyboard) that may be used by a user as an input device.

As shown in FIG. 1, the display portion 120 has a bottom portion 135 operably coupled to the base portion 105 via rotating portion 155, a barrel portion 160 and a receptacle 165 (which collectively define a hinge). The display portion 120 also has a top portion 140 on an end of the display portion 120 that is opposite the bottom portion 135. The base portion 105 has a front portion at a front end 145, and has a back portion at a back end 150 of the base portion 105. According to example embodiments, a distal direction is towards the back end 150 of the base portion 105, and a proximal direction is towards the front end 145 of the base portion 105. Accordingly, the front end 145 can also be referred to as a proximal end of the base portion 105, and the back end 150 can be referred to as a distal end of the base portion 105.

The display portion 120 is configured to rotate and translate with respect to the base portion 105 in various configurations so that the display 125 and input devices included in the input device region 110 may be used differently in the various configurations. For example, the display portion 120 may be configured to rotate and translate from the configuration shown in FIG. 2 (in which the computing device 100 may be used in a fashion similar to a typical laptop computer) to a configuration where the display portion 120 covers one or more input devices included in the input device 110 of the base portion 105 while the display 125 is facing away from the base portion 105 so that the computing device 100 may be used as a tablet-type computing device as shown in FIG. 4. More details related to various configurations of the computing device 100 are described below in connection with FIG. 3 as well as the remaining figures.

Although not shown, in one or more example embodiments, the base portion 105 may include various computing components such as one or more processors, a graphics processor, a motherboard, a memory (e.g., a disk drive, a solid-state drive), and/or so forth. One or more images displayed on the display 125 may be triggered by the computing components included in the base portion 105. In one or more example embodiments, one or more wires configured to communicate signaling (e.g., video signals, signals generated in response to interactions with the display 125) between the display 125 and the base portion 105 may be associated with one or more of the barrel 160 and/or receptacle 165. Alternatively (or in addition to), the base portion 105 and the display portion 120 each may include a wireless transceiver configured to communicate signals using, for example, the BLUETOOTH™, standard.

Although not shown, in one or more example embodiments, the display portion 120 may include various computing components such as one or more processors, a graphics processor, a motherboard, a memory (e.g., a disk drive, a solid-state drive), and/or so forth. One or more peripheral devices (e.g., DVD drive) may be included in the base portion 105. In one or more example embodiments, one or more wires configured to communicate signaling (e.g., video signals, signals generated in response to interactions with the display 125) between the display 125 and the base portion 105 may be associated with one or more of the barrel 160 and/or receptacle 165. Alternatively (or in addition to), the base portion 105 and the display portion 120 each may include a wireless transceiver configured to communicate signals using, for example, the BLUETOOTH™, standard.

As shown in FIG. 1 (and the subsequent figures), the computing device 100 may be a personal computing laptop-type device. In one or more example embodiments, the computing device 100 may be any type of computing device. The computing device 100 may be, for example, a wired device and/or a wireless device (e.g., WI-FI enabled device) and may be, for example, a computing entity (e.g., a personal computing device), a television including at least one processor, a server device (e.g., a web server), a mobile phone, a personal digital assistant (PDA), an e-book device, and/or so forth. The computing device 100 may be configured to operate based on one or more platforms (e.g., one or more similar or different platforms) that may include one or more types of hardware, software, firmware, operating systems, runtime libraries, and/or so forth. More details related to various configurations of a computing device that has a display portion configured to move with respect to a base portion are described in connection with the figures below.

According to one or more example embodiments, the base portion 105 and the display portion 120 may operate independently. For example, the display portion 120 may be a tablet computing device and the base portion 105 may be a docking station for use with a tablet device. The display portion 120 may be configured for use with or without a sleeve or case. For example, the display portion 120 may include receptacle 165 as a permanent element of the display portion 120. Alternatively, receptacle 165 may be an element of a sleeve or case configured to receive or encase the display portion 120 (e.g., as a tablet computer).

Figure 2A:
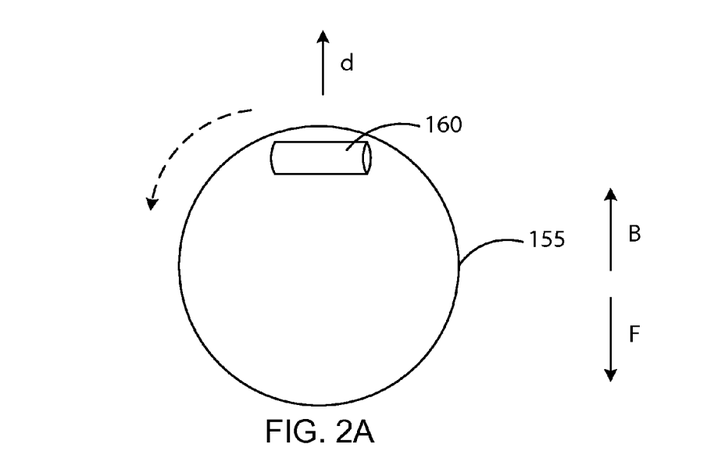
FIGS. 2A-2C illustrate views of a hinge for a computing device including a base portion and a display portion according to an example embodiment.
Figure 2B:
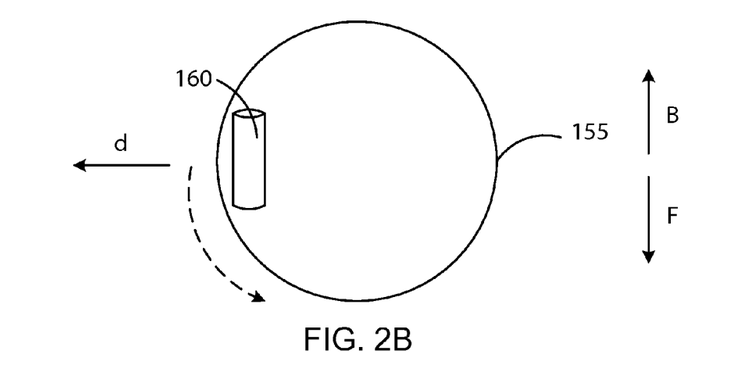
Figure 2C:
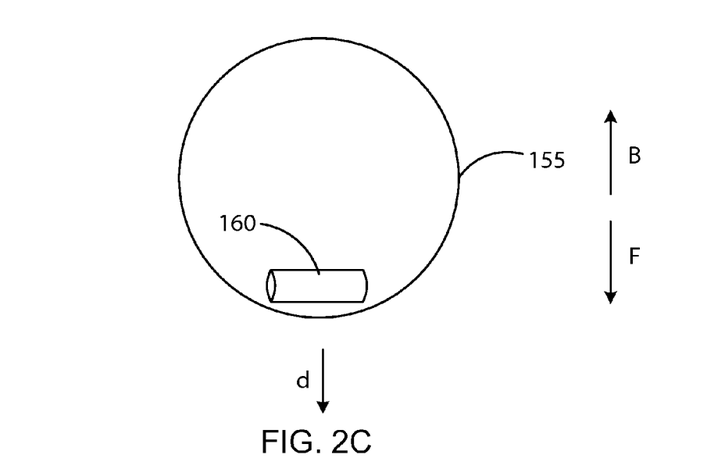

FIGS. 2A-2C illustrate views of a hinge for a computing device including a base portion and a display portion according to an example embodiment. As shown in FIGS. 2A-2C, the display portion 120 may be configured to translate in a forward direction (direction F) (i.e., a proximal direction) with respect to the base portion 105 towards the front end 145 of the base portion 105, and may be configured to translate in a backward direction (direction B) (i.e., a distal direction) with respect to the base portion 105 towards the back end 150 of the base portion 105.

FIG. 2A shows the hinge including the rotating portion 155, the barrel portion 160 with the barrel portion 160 at a twelve o'clock position (the twelve o'clock position being the backward direction B). The rotating portion 155 is translated in a counter-clockwise direction (as illustrated by the dashed arrows). The rotating portion 155 may translate such that the barrel portion 160 passes through a nine o'clock position, as shown in FIG. 2B, to a six o'clock position (the six o'clock position being the forward direction F), as shown in FIG. 2C. While translating, the display portion 120 may be in a fixed configuration. For example, the display portion 120 may be fixed such that display surface 130 faces toward direction d. Alternatively, the display portion 120 may be fixed such that display surface 130 faces away from direction d. Alternatively, if the display portion 120 is flat against the base portion 105 (with the display portion facing away from the base portion) the display portion 120 may be fixed such that an edge of the display portion 120 faces toward direction d.

Further (although not shown), the rotating portion 155 may be translated clockwise direction (e.g., through a three o'clock position). Still further, the display portion 120 may translate in a backward direction (direction B) by reversing the order described above (e.g., translating from the position shown in FIG. 2C to the position shown in FIG. 2A).

Figure 3:
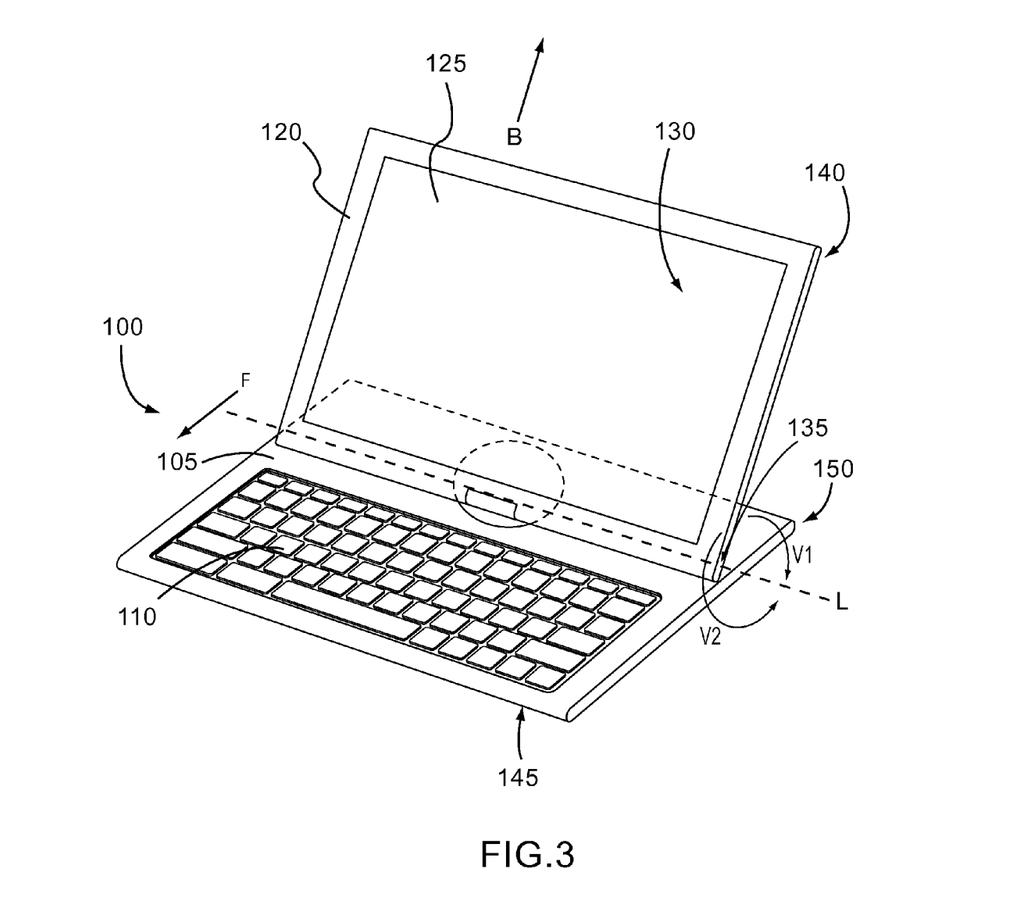
FIG. 3 illustrates another view of a computing device including a base portion and a display portion operably coupled to the base portion according to an example embodiment.
Figure 4:
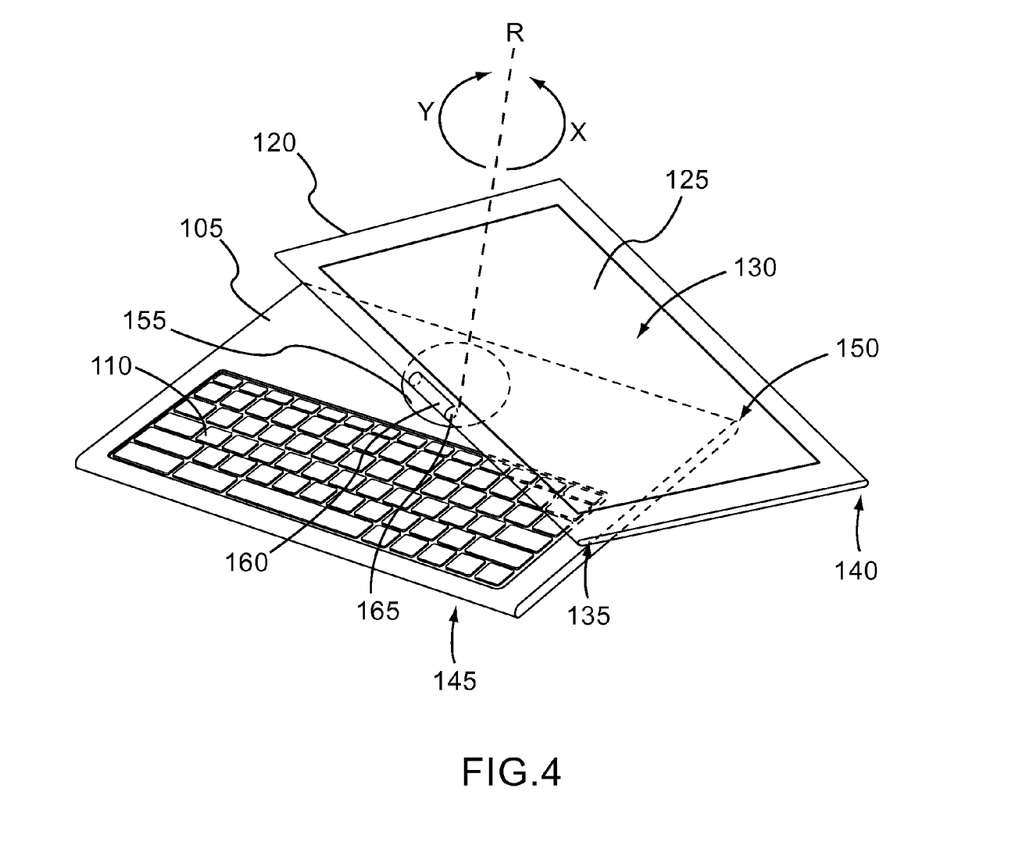
FIG. 4 illustrates yet another view of a computing device including a base portion and a display portion operably coupled to the base portion according to an example embodiment.

FIG. 3 illustrates another view of the computing device 100 including the base portion 105 and the display portion 120 operably coupled to the base portion 105 according to an example embodiment. As shown in FIG. 3, the display portion 120 is configured to rotate about an axis L of the bottom portion 135 of the display portion 120. Specifically, the display portion 120 is configured to rotate about the axis L in a clockwise direction V1 or in a counterclockwise direction V2 as shown in FIG. 3. Thus, the display portion 120 may be configured to rotate between various rotational positions about the axis L.

According to one or more example embodiments, the display portion 120 may be configured to rotate in the clockwise direction V1 until the display portion 120 is parallel to the base portion 105 (or substantially parallel) and the display surface 130 is facing away from the base portion 105. Said differently, the display portion 120 may be configured to rotate in the clockwise correction V1 until the display portion 120 is flat with respect to the base portion 105. Thus, the display portion 120 and the base portion 105 may be aligned along a common plane (or different planes that are parallel (or substantially parallel) to one another) with the display surface 130 facing away from the base portion 105. In one or more example embodiments, if the display portion 120 is positioned such that a plane (e.g., a primary plane) along which the display portion (e.g., a viewable surface of the display portion) is aligned is substantially parallel to a plane (e.g., a primary plane) along which the base portion 105 (e.g., a bottom or top of the base portion 105) is aligned, the computing device 100 may be referred to as being in a closed position. If the computing device 100 is in the closed position, the display surface 130 may be accessible by a user and the computing device may be utilized as a tablet computer. In one or more example embodiments, if the computing device 100 is in the closed position, at least a portion of the input device region 110 may not be accessible by a user of the computing device 100.

Further, the display portion 120 may be configured to rotate in the counterclockwise direction V2 until the display portion 120 is or approaches perpendicular (or substantially perpendicular) to the base portion 105 with the display surface 130 facing a user plane extending away from the input device region 110. Said differently, the display portion 120 may be configured to rotate in the counterclockwise correction V2 until the display portion 120 is perpendicular with respect to the base portion 105 such that the display 125 faces toward a user of the input device region 110. From this position, the display portion 120 may be rotated around an axis of the hinge (e.g., axis R described below with regard to FIG. 4) such that the display 125 faces away from a user of the input device region 110.

As shown in FIG. 3, the display portion 120 is further configured to translate with respect to the base portion 105 in a translational direction. Specifically, as the display portion 120 is positioned as in FIG. 3, the display portion 120 may be configured to translate in a forward direction (direction F) (i.e., a proximal direction) with respect to the base portion 105 towards the front end 145 of the base portion 105, and may be configured to translate in a backward direction (direction B) (i.e., a distal direction) with respect to the base portion 105 towards the back end 150 of the base portion 105 as described above with regard to FIG. 2. Alternatively (or in addition to), the display portion 120 may be configured to move between various translational positions along the base portion 105. As shown in FIG. 2, the forward direction and the backward direction, which may be characterized as translational directions, are orthogonal to (e.g., substantially orthogonal to) the axis L.

Figure 5:
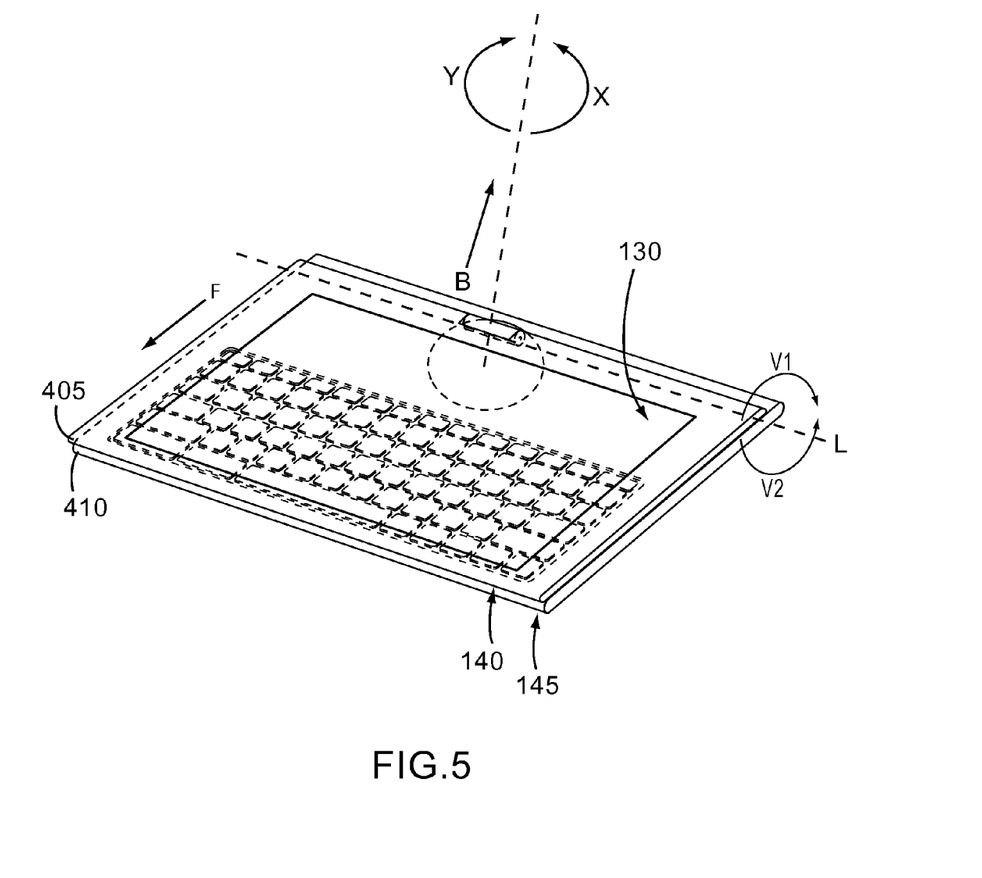
FIG. 5 illustrates still another view of a computing device including a base portion and a display portion operably coupled to the base portion according to an example embodiment.

Further, if the display portion 120 is rotated around an axis (e.g., axis L as shown in FIG. 5) of the hinge at some angle, the display portion 120 may be configured to translate in a forward direction (direction F) shifted by an angle of rotation with respect to the base portion 105 towards the front end 145 of the base portion 105, and may be configured to translate in a backward direction (direction B) shifted by the angle of rotation with respect to the base portion 105 towards the back end 150 of the base portion 105.

In the embodiment shown in FIG. 3, the display portion 120 may configured to rotate about the axis L if the display portion 120 is in any translational position with respect to the base portion 105. For example, the display portion 120 may be configured to rotate about the axis L in the clockwise direction V1 or the counterclockwise direction V2 if the display portion 120 is at a first translational position where the display portion 120 is disposed over the front portion of the base portion 105. The display portion 120 may also be configured to rotate about the axis L in the clockwise direction V1 or the counterclockwise direction V2 if the display portion 120 is at a second translational position where the display portion 120 is disposed over the back portion of the base portion 105.

In one or more example embodiments, the computing device 100 may be configured so that the display portion 120 may not be configured to rotate about the axis L when the display portion 120 is in an arbitrary translational position with respect to the base portion 105. For example, the computing device 100 may be configured so that the display portion 120 may rotate about the axis L if the display portion 120 is disposed distal to the input device region 110 and if the display portion 120 is proximal to the input device region 110, but not if the display portion 120 is disposed in a transitional translation position (e.g., between the distal position and the proximal position). In other words, the display portion 120 may not be configured to rotate about the axis L if the display portion 120 is at some midpoint on the hinge rotating portion 155.

In one or more embodiments, the display portion 120 may be rotated with respect to the base portion 105 such that at least a portion of the input device region 110 is covered. For example, when in a closed (or partially closed) position (with the display 125 facing away from the base portion 105), the display portion 120 may be configured to cover at least a portion of the input device region 110 (so that the portion of the input device region 110 is not readily accessible to a user of the computing device 100).

In one or more example embodiments, various components (e.g., one or more input devices included in the input device region 110) of the computing device 100 may be activated (e.g., changed to an active/on state or operational state) or deactivated (e.g., changed to a deactivated/off state or standby state) when the display portion 120 is moved between various translational positions and/or rotational positions with respect to the base portion 105. For example, an input device included in the input device region 110 may be changed from a deactivated state to an activated state when the computing device 100 is changed from a closed position to an open position.

More details related to various configurations of the computing device 100 are described below in connection with FIG. 4 as well as the remaining figures. FIG. 4 illustrates yet another view of the computing device 100 including the base portion 105 and a display portion 120 operably coupled to the base portion 105 according to an example embodiment.

According to one or more example embodiments, as shown in FIG. 4, the display portion 120 may be configured to rotate about an axis R of the bottom portion 135 of the display portion 120 via the rotating portion 155, the barrel portion 150 and the receptacle 165 (which collectively define a hinge). In one or more example embodiments, the display portion 120 may be configured to rotate about the axis R in a clockwise direction Y or in a counterclockwise direction X as shown in FIG. 4. Thus, the display portion 120 may be configured to rotate between various rotational positions about the axis R.

According to one or more example embodiments, the display portion 120 and the base portion 105 may be aligned along a common plane (or different planes that are parallel (or substantially parallel) to one another) with the display surface 130 facing away from the base portion 105. The display portion 120 may be configured to rotate between various rotational positions about the axis R if aligned as such.

According to one or more example embodiments, the display portion 120 may be configured to approach perpendicular (or substantially perpendicular) to the base portion 105 with the display surface 130 facing toward, facing away or facing some angle in-between a user plane extending away from the input device region 110. The display portion 120 may be configured to rotate between various rotational positions about the axis R if aligned as such.

As shown in FIG. 4, the display portion 120 is rotated about the axis R in the clockwise direction Y. More details related to various configurations of the computing device 100 are described below in connection with FIG. 5 as well as the remaining figures. For example, if the display portion 120 is further rotated about the axis R in the clockwise direction Y, the computing device 100 may be in the closed (or substantially closed) position as shown in FIG. 5. FIG. 5 illustrates still another view of the computing device 100 including the base portion 105 and the display portion 120 operably coupled to the base portion 105 according to an example embodiment.

As shown in FIG. 5, the display portion 120 may be configured to rotate in the clockwise direction Y until the display portion 120 is parallel to the base portion 105 (or substantially parallel) and the display surface 130 is facing away from the base portion 105. Said differently, the display portion 120 may be configured to rotate in the clockwise correction Y until the display portion 120 is flat with respect to the base portion 105. Thus, the display portion 120 and the base portion 105 may be aligned along a common plane (or different planes that are parallel (or substantially parallel) to one another) with the display surface 130 facing away from the base portion 105. The display portion 120 may be aligned with the base portion 105 such that a corner 405 of the top portion 140 of the display portion 120 may aligned with (or substantially aligned with) a corner 410 of the front end 145 of the base portion 105.

In one or more example embodiments, if the display portion 120 is positioned such that a plane (e.g., a primary plane) along which the display portion (e.g., a viewable surface of the display portion) is aligned is substantially parallel to a plane (e.g., a primary plane) along which the base portion 105 (e.g., a bottom or top of the base portion 105) is aligned, the computing device 100 may be referred to as being in a closed position. If the computing device 100 is in the closed position, the display surface 130 may be accessible by a user and the computing device may be utilized as a tablet computer. In one or more example embodiments, if the computing device 100 is in the closed position, at least a portion of the input device region 110 may not be accessible by a user of the computing device 100.

Although the elements that collectively define the hinge are described as the rotating portion 155, the barrel portion 150 and the receptacle 165, example embodiments are not limited thereto. For example, the rotating portion 155 is shown in the shape of a circle. However, example embodiments may include an oval, a square, a 'D' shape, a polygon and the like. For example, the barrel portion 150 may be a ball and the receptacle may be shaped to receive the ball.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A computing device, comprising:
a base portion including a keyboard;
a display portion including a display, the display including a viewable surface; and
a hinge including a rotating portion included in the base portion, the rotating portion being rotatable about a first axis of rotation, and a barrel portion directly coupled to the rotating portion to operably couple the base portion and the display portion, the barrel portion defining a second axis of rotation, the display portion being rotatable about the barrel portion such that:
in a first closed position of the computing device, the viewable surface faces in a first direction away from the base portion,
in a second closed position of the computing device, the viewable surface faces in second direction toward the base portion, with a portion of the viewable surface positioned adjacent to the keyboard, and
in a transition from the first closed position to an open position of the computing device, the barrel portion of the hinge is rotated about the first axis of rotation and is shifted by an angle of rotation with respect to the base portion, with a primary plane of the display portion being substantially parallel to a primary plane of the base portion in the first closed position, and is rotated about the second axis of rotation such that the viewable surface of the display portion faces a user plane extending from the keyboard and approaches a perpendicular position with respect to the base portion.

2. The computing device of claim 1, wherein
the base portion includes a first set of computing components and a first wireless transceiver,
the display portion includes a second set of computing components and a second wireless transceiver, and
the first wireless and the second wireless communicatively couple the first set of computing components with the second set of computing components.

3. The computing device of claim 1, wherein
the base portion includes peripheral computing components and a first wireless transceiver,
the display portion includes a primary computing components and a second wireless transceiver, the primary computing components including a processor and a battery,
the first wireless and the second wireless communicatively couple the peripheral set of computing components with the primary set of computing components, and
the hinge is further configured to decouple the display portion from the base portion.

4. The computing device of claim 1, wherein
the hinge is further configured to rotate around the first axis such that the viewable portion faces a back plane extending from a back edge of the base portion, the hinge being between the back edge and the keyboard.

5. The computing device of claim 1, wherein
the display portion includes a receptacle for the barrel portion of the hinge, and
the receptacle is configured to receive the barrel portion of the hinge such that the receptacle rotates about the second axis of rotation defined by the barrel portion.

6. The computing device of claim 1, wherein
the display portion includes a receptacle for the hinge, and the receptacle is configured to detach the display portion from the base portion.

7. The computing device of claim 1, wherein
the display portion includes a receptacle for the hinge, and the receptacle is configured to align edges of the base portion with edges of the display portion when the computing device is in the first closed position.

8. The computing device of claim 1, wherein
the keyboard is exposed and the keyboard is in an activated state if the computing device is in the open position, and
the keyboard is in a deactivated state if the computing device is in the first closed position.

9. A computing device, comprising:
a docking station including a keyboard;
a tablet computer including a display, the display including a viewable surface; and
a hinge including a rotating portion in the docking station and a barrel portion directly coupling the docking station and the tablet computer, wherein
in a first closed position of the computing device the viewable surface faces in a first direction away from the base portion,
in a second closed position of the computing device the viewable surface faces in a second direction toward the base portion, with at least a portion of the viewable surface positioned adjacent to the keyboard, and
in a transition from the first closed position to an open position of the computing device, the barrel portion of the hinge is rotated about a first axis of rotation and is shifted by an angle of rotation with respect to the docking station, with a primary plane of the tablet computer being substantially parallel to a primary plane of the docking station, and is rotated about a second axis of rotation defined by the barrel portion of the hinge such that the viewable surface of the tablet computer faces a user plane extending from the keyboard and approaches a perpendicular position with respect to the docking station.

10. The computing device of claim 9, wherein
the docking station includes a first set of computing components and a first wireless transceiver,
the tablet computer includes a second set of computing components and a second wireless transceiver, and
the first wireless and the second wireless communicatively couple the first set of computing components with the second set of computing components.

11. The computing device of claim 9, wherein
the docking station includes peripheral computing components and a first wireless transceiver,
the tablet computer includes a primary computing components and a second wireless transceiver, the primary computing components including a processor and a battery,
the first wireless and the second wireless communicatively couple the peripheral set of computing components with the primary set of computing components, and
the hinge is further configured decouple the tablet computer from the docking station.

12. The computing device of claim 9, wherein the barrel portion is configured to slide perpendicular to the first axis of rotation, from one edge of the rotating portion to another edge of the rotating portion.

13. The computing device of claim 9, wherein
the hinge is further configured to rotate around the first axis such that the viewable portion faces a back plane extending from a back edge of the docking station, the hinge being between the back edge and the keyboard.

14. The computing device of claim 9, wherein
the tablet computer includes a receptacle for the hinge, and
the receptacle is configured to receive the barrel portion of the hinge such that the receptacle rotates around the barrel portion of the hinge.

15. The computing device of claim 9, wherein
the tablet computer includes a receptacle for the hinge, and
the receptacle is configured to detach the tablet computer from the docking station.

16. The computing device of claim 9, wherein
the tablet computer includes a receptacle for the hinge, and
the receptacle is configured to align edges of the docking station with edges of the tablet computer when the computing device is in the first closed position.

17. The computing device of claim 9, wherein
the keyboard is exposed and the keyboard is in an activated state when the computing device is in the open position, and
the keyboard is in a deactivated state when the computing device is in the first closed position.

18. The computing device of claim 9, wherein the hinge is an element of a case configured to encase the tablet computer.

* * * * *